United States Patent [19]

Ohnishi

[11] Patent Number: 6,147,169
[45] Date of Patent: Nov. 14, 2000

[54] CURABLE COATING COMPOSITION

[75] Inventor: Kazuhiko Ohnishi, Hiratsuka, Japan

[73] Assignee: Kansai Paint Co., Ltd., Hyogo-ken, Japan

[21] Appl. No.: 09/047,459

[22] Filed: Mar. 25, 1998

[30] Foreign Application Priority Data

Mar. 25, 1997 [JP] Japan ................................. 9-071092

[51] Int. Cl.$^7$ .......................... C08G 59/22; C08G 59/32; C08G 59/50; C08G 59/62
[52] U.S. Cl. ...................... 525/523; 525/403; 548/335.1; 568/722; 568/723; 568/720
[58] Field of Search ................................. 525/523, 403; 548/335.1; 568/720, 722, 723

[56] References Cited

U.S. PATENT DOCUMENTS

| | | | |
|---|---|---|---|
| 3,941,850 | 3/1976 | Brindell et al. | 568/720 |
| 4,711,936 | 12/1987 | Shibanai | 525/485 |
| 5,364,977 | 11/1994 | Asai et al. | 568/720 |

FOREIGN PATENT DOCUMENTS

| | | |
|---|---|---|
| 0 816 349 | 7/1998 | European Pat. Off. . |
| 949286 | 10/1999 | European Pat. Off. . |
| 4978/93 | 1/1993 | Japan . |
| 12907-96 | 2/1996 | Japan . |
| 8-176126 | 7/1996 | Japan . |
| 1192611 | 5/1970 | United Kingdom . |

OTHER PUBLICATIONS

Encyclopedia of Chemical Technology, 4th Ed., vol. 14, Edited by J. I. Kroschwitz et al. John Wiley & Sons, 1995.

*Primary Examiner*—Robert Dawson
*Assistant Examiner*—Kuo-Liang Peng
*Attorney, Agent, or Firm*—Fisher, Christen & Sabol

[57] ABSTRACT

A curable coating composition comprising (A) a functional group-containing base resin and (B) a clathrate compound consisting of (i) at least one guest compound selected from the group consisting of a curing agent having a functional group crosslinkable with the functional group of the base resin and a curing catalyst, and (ii) a host compound consisting of tetrakisphenols.

5 Claims, No Drawings

CURABLE COATING COMPOSITION

BACKGROUND OF THE INVENTION (1) Field of the Invention

The present invention relates to a new curable coating composition.

(2) Description of Background Art

A curable coating composition containing a functional group-containing base resin and a curing agent having a functional group crosslinkable with the functional group of the base resin and capable of forming a cured film by a crosslinking reaction at room temperature or by heating between the base resin and the curing agent has been known in the art.

However, a crosslinking reaction at room temperature or by heating at a low temperature in the curable coating composition is required to rapidly take place the reaction between the base resin and the curing agent, resulting in making poor the storage stability of the coating composition. On the other hand, use of a curable coating composition having good storage stability requires heat curing at a high temperature. Thus, requirement for good storage stability of the coating composition and that for curing at a low temperature are inconsistent with each other, resulting making it impossible to satisfy both requirements at the same time. Further, a two-pack type curable coating composition, in which the base resin and the curing agent are mixed for use prior to the coating step, for example, an isocyanate-curing coating composition has also known in the art. However, the above coating composition has such drawbacks that the mixing procedures are troublesome and that use thereof beyond a pot life of about 4 hours causes thickening so as to be unusable, resulting in that the coating composition shows poor coating workability.

On the other hand, a clathrate compound consisting of a host compound having a hollow space and a guest compound included into the hollow space of the host compound.

Japanese Patent Application Laid-Open No. 4978/93 discloses the use of tetrakis(hydroxyphenyl)ethane as a clathrate compound.

Japanese Patent Application Laid-Open No. 12907/96 discloses a material for preventing an aquatic life from being adhered as a coating composition using the above host compound.

Japanese Patent Application Laid-Open No. 176126/96 discloses a coating composition containing a new clathrate compound.

The above two references further discloses that addition of clathrate compounds consisting of tetrakis(hydroxyphenyl)ethan as the host compound and bactericide or antibacterial agent as the guest compound to the coating composition shows good effect on antibacterial properties and bactericidal properties with slight stimuli onto the skin.

The above references are all silent about addition of a clathrate compound consisting of tetrakis(hydroxyphenyl)ethane as the host compound and a curing agent and/or curing catalyst as the guest compound to a curable coating composition.

SUMMARY OF THE INVENTION

It is an object of the present invention to provide a curable coating composition showing good storage properties and capable forming a coating film showing good low temperature-curing properties in appearance, adhesion properties and anticorrosion properties.

That is, the present invention provides a curable coating composition comprising (A) a functional group-containing base resin and (B) a clathrate compound consisting of (i) at least one guest compound selected from the group consisting of a curing agent having a functional group crosslinkable with the functional group of the base resin and a curing catalyst, and (ii) a host compound consisting of tetrakisphenols.

DETAILED DESCRIPTION OF THE INVENTION

Examples of tetrakisphenols used as the host compound in the coating composition of the present invention may include ones represented by the following general formulas (I) and (II):

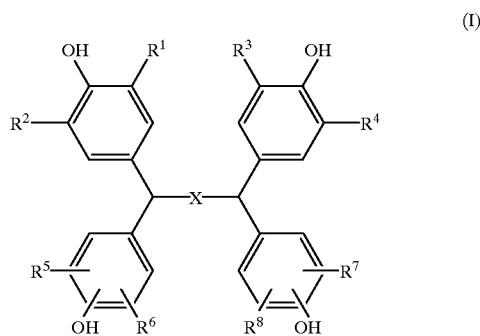

where X represents $(CH_2)_n$, represents 0, 1 or 2, $R^1$ to $R^8$ represent at least one selected from the group consisting of hydrogen atom, lower alkyl group, halogen atom, lower alkoxy group and substituted or unsubstituted phenyl group respectively;

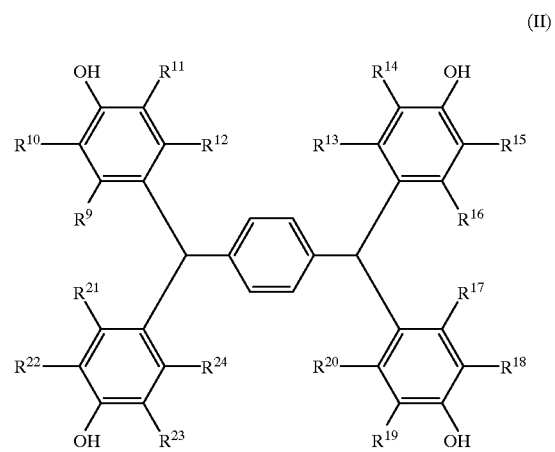

where $R^9$ to $R^{24}$ respectively represent at least one selected from hydrogen atom, lower alkyl group, halogen atom, lower alkoxy group and substituted or unsubstituted phenyl group.

In the general formulas (I) and (II), the lower alkyl group may preferably include methyl, ethyl, propyl and isopropyl groups, and the lower alkoxy group may preferably include methoxy, ethoxy, propoxy and isopropoxy groups.

Examples of tetrakisphenols represented by the general formula (I) may include 1,1,2,2-tetrakis(4-hydroxyphenyl) ethane, 1,1,2,2-tetrakis(3-methyl-4-hydroxyphenyl)ethane, 1,1,2,2-tetrakis(3-bromo-4-hydroxyphenyl), 1,1,2,2-tetrakis(3,5-dimethyl-4-hydroxyphenyl)ethane, 1,1,2,2- tetrakis(3-t-butyl-4-hydroxyphenyl)ethane, 1,1,2,2-tetrakis(3-chloro-4-hydroxyphenyl)ethane, 1,1,2,2-tetrakis(3,5-dichloro-4-hydroxyphenyl)ethane, 1,1,2,2-tetrakis(3-fluoro-4-hydroxyphenyl)ethane, 1,1,2,2-tetrakis(3,5-difluoro-4-hydroxyphenyl)ethane, 1,1,2,2-tetrakis(3-methoxy-4-hydroxyphenyl)ethane, 1,1,2,2-tetrakis(3,5-dimethoxy-4-hydroxyphenyl)ethane, 1,1,2,2-tetrakis(3-chloro-5-methyl-4-hydroxyphenyl)ethane, 1,1,2,2-tetrakis(3-chloro-5-phenyl-4-hydroxyphenyl)ethane, 1,1,2,2-tetrakis[(4-hydroxy-3-phenyl)phenyl]ethane, 1,1-bis(4-hydroxyphenyl)-2,2-bis(3-methyl-4-hydroxyphenyl)ethane, 1,1,3,3-tetrakis(4-hydroxyphenyl)propane, 1,1,3,3-tetrakis(3-methyl-4-hydroxyphenyl)propane, 1,1,3,3-tetrakis(3,5-dimethyl-4-hydroxyphenyl)propane, 1,1,3,3-tetrakis(3-chloro-4-hydroxyphenyl)propane, 1,1,3,3-tetrakis(3,5-dichloro-4-hydroxyphenyl)propane, 1,1,3,3-tetrakis(3-fluoro-4-hydroxyphenyl)propane, 1,1,3,3-tetrakis(3,5-difluoro-4-hydroxyphenyl)propane, 1,1,3,3-tetrakis(3-phenyl-4-hydroxyphenyl)propane, 1,1,4,4-tetrakis(4-hydroxyphenyl)butane, 1,1,4,4-tetrakis(3-methyl-4-hydroxyphenyl)butane, 1,1,4,4-tetrakis(3,5-dimethyl-4-hydroxyphenyl)butane, 1,1,4,4-tetrakis(3-chloro-4-hydroxyphenyl)butane, 1,1,4,4-tetrakis(3,5-dichloro-4-hydroxyphenyl)butane, 1,1,4,4-tetrakis(3-fluoro-4-hydroxyphenyl)butane, 1,1,4,4-tetrakis(3,5-difluoro-4-hydroxyphenyl)butane and the like.

Examples of tetrakisphenols represented by the general formula (II) may include α,α,α',α'-tetrakis(4-hydroxyphenyl)-p-xylene, α,α,α',α'-tetrakis(4-hydroxyphenyl)-m-xylene, α,α,α',α'-tetrakis(4-hydroxyphenyl)-o-xylene, α,α,α',α'-tetrakis(4-hydroxy-3-methylphenyl)-p-xylene, α,α,α',α'-tetrakis(4-hydroxy-3-chlorophenyl)-p-xylene, α,α,α',α'-tetrakis(4-hydroxy-3-ethylphenyl)-p-xylene, α,α,α',α'-tetrakis(4-hydroxy-3-isopropylphenyl)-p-xylene, α,α,α',α'-tetrakis(4-hydroxy-3-chlorophenyl)-m-xylene, α,α,α',α'-tetrakis(4-hydroxy-3-methylphenyl)-m-xylene, α,α,α',α'-tetrakis(4-hydroxy-3-ethylphenyl)-m-xylene, α,α,α',α'-tetrakis(4-hydroxy-3-isopropylphenyl)-m-xylene, α,α,α',α'-tetrakis(4-hydroxy-3-methylphenyl)-o-xylene, α,α,α',α'-tetrakis(4-hydroxy-3-chlorophenyl)-o-xylene, α,α,α',α'-tetrakis(4-hydroxy-3-ethylphenyl)-o-xylene, α,α,α',α'-tetrakis(4-hydroxy-3-isopropylphenyl)-o-xylene, α,α,α',α'-tetrakis(4-hydroxy-3-t-butylphenyl)-p-xylene, α,α,α',α'-tetrakis(4-hydroxy-3-bromophenyl)-p-xylene, α,α,α',α'-tetrakis(4-hydroxy-3-iodophenyl)-p-xylene, α,α,α',α'-tetrakis(4-hydroxy-3-methoxyphenyl)-p-xylene, α,α,α',α'-tetrakis(4-hydroxy-3-ethoxyphenyl)-p-xylene, α,α,α',α'-tetrakis(4-hydroxy-3-isopropoxyphenyl)-p-xylene, α,α,α',α'-tetrakis(4-hydroxy-3-t-butoxyphenyl)-p-xylene, α,α,α',α'-tetrakis(3-hydroxyphenyl)-p-xylene, α,α,α',α'-tetrakis(3-hydroxy-4-chlorophenyl)-p-xylene, α,α,α',α'-tetrakis(3-hydroxy-4-bromophenyl)-p-xylene, α,α,α',α'-tetrakis(3-hydroxy-4-iodophenyl)-p-xylene, α,α,α',α'-tetrakis(3-hydroxy-4-methoxyphenyl)-p-xylene, α,α,α',α'-tetrakis(3-hydroxy-4-ethoxyphenyl)-p-xylene, α,α,α',α'-tetrakis(2-hydroxyphenyl)-p-xylene, α,α,α',α'-tetrakis(2-hydroxy-4-chlorophenyl)-p-xylene, α,α,α',α'-tetrakis(2-hydroxy-4-methylphenyl)-p-xylene, α,α,α',α'-tetrakis(2-hydroxy-4-methoxyphenyl)-p-xylene, α,α,α',α'-tetrakis(4-hydroxy-3,5-dichlorophenyl)-p-xylene, α,α,α',α'-tetrakis(4-hydroxy-3,5-dimethylphenyl)-o-xylene, α,α, α',α'-tetrakis(4-hydroxy-3-chloro-5-methylphenyl)-p-xylene, α,α,α',α'-tetrakis(4-hydroxyphenyl)-3-chloro-p-xylene, α,α,α',α'-tetrakis(4-hydroxyphenyl)-3-methyl-p-xylene, α,α,α',α'-tetrakis(4-hydroxyphenyl)-3-methoxy-p-xylene, α,α-bis(4-hydroxyphenyl)-α',α'-bis(3-chloro-4-hydroxyphenyl)-p-xylene, α,α-bis(4-hydroxyphenyl)-α',α'-bis(3-methoxy-4-hydroxyphenyl)-p-xylene, α,α,α'-tris(4-hydroxyphenyl)-α'-3-chlorophenyl-p-xylene, α,α,α'-tris(4-hydroxyphenyl)-α'-3-methylphenyl-p-xylene, α,α,α'-tris(4-hydroxyphenyl)-α'-3-methoxyphenyl-p-xylene and the like.

The curing agent used as the guest compound in the present invention is a curing agent capable of forming a crosslinked coating film by reacting with a functional group of the base resin in the curable coating composition. The curing catalyst used as the guest compound in the present invention is a catalyst for the above reaction. The curing agent may be selected from ones having a functional group reactive with a functional group of the base resin to be used in combination. Examples of combinations between functional groups may include an (unhydrous)carboxyl group-containing curing agent with a base resin having a functional group such as epoxy group, hydroxyl group or the like; an epoxy group-containing curing agent with a base resin having a functional group such as hydroxyl group, (unhydrous)carboxyl group, methylol group, chloro group, amide group or the like; an isocyanate group-containing curing agent with a base resin having a functional group such as hydroxyl group, (hydrolyzable silane)silanol group or the like; an amino group-containing curing agent with a base resin having a functional group such as hydroxyl group or the like; a (hydrolyzable silane)silanol group-containing curing agent with a base resin having a functional group such as hydroxyl group, carboxyl group, epoxy group or the like; an amine or amide group-containing curing agent with a base resin having a functional group such as epoxy group, (anhydrous)carboxyl group or the like; a phenol group-containing curing agent with a base resin having a functional group such as epoxy group or the like; an imidazole group-containing curing agent with a base resin having a functional group such as epoxy group or the like; a hydroxyl group-containing curing agent with a base resin having a functional group such as isocyanate group, (anhydroous)carboxyl group, (alkoxy)methylol group, amino group, epoxy group, silanol group or the like; a radical polymerization initiator, which may also be used as a catalyst, with a radical polymerizable unsaturated group-containing base resin; a cationic polymerization curing agent, which may also be used as a catalyst, with an epoxy group-containing base resin, and the like.

Examples of the (anhydrous)carboxyl group-containing curing agent may include (anhydrous)phthalic acid, (anhydrous)hexahydrophthalic acid, (anhydrous)trimellitic acid, (anhydrous)pyromellitic acid, dodecane diacid, stearic acid, succinic acid and the like.

Examples of the epoxy group-containing curing agent may include (poly)alkylene glycol diglycidyl ether, glycerin triglycidyl ether, triglycidyl isocyanurate, bisphenol diglycidyl ether, dicyclopentadiene dieneoxide, epoxy group-containing vinyl polymer, and the like.

Examples of the isocyanate group-containing curing agent may include various organic isocyanates such as aliphatic diisocyanates such as hexamethylene diisocyanate and trimethylhexamethylene diisocyanate, alicyclic diisocyanates such as hydrogenated xylylene diisocyanate and isophorone diisocyanate, aromatic diisocyanates such as tolylene diisocyanate and 4,4'-diphenylmethane diisocyanate, and the like; adducts of respective organic diisocyanates with polyhydric alcohol, low molecular weight polyester resin, water or the like; the above cyclic polymerization products between respective organic diisocyanates; isocyanate biuret, and the like.

Examples of the amino group-containing curing agent may include methylol amino resin prepared by reaction of an amino component such as melamine, urea, benzoguanamine, acetoguanamine, steroguanamine, spiroguanamine, dicyandiamide or the like with aldehyde. Examples of the aldehyde may include formaldehyde, paraformaldehyde, acetoaldehyde, benzaldehyde and the like. The methylol amino resin may be etherified with a suitable alcohol to be used. Examples of the alcohol used for etherification may include methyl alcohol, ethyl alcohol, n-propyl alcohol, i-propyl alcohol, n-butyl alcohol, i-butyl alcohol, 2-ethyl butanol, 2-ethyl hexanol and the like.

Examples of the (hydrolyzable silane)silanol group-containing curing agent may include tetramethoxysilane, tetraethoxysilane, dimer to decamer thereof, (hydrolyzable silane)silanol group-containing vinyl polymer, and the like.

Examples of the amine or amide group-containing curing agent may include aliphatic amine such as ethylenediamine, diethylenetriamine, triethylenetetramine, tetraethylenepentamine, diethyl-amino-propylamine, pentanediamine, aminoethylpiperazine and the like; aromatic polyamine such as m-phenylenediamine, p, p'-diamino-diphenylmethane, diaminodiphenyl-sulfone, benzyldimethylamine, and the like, amide group-containing compounds such as dicyandiamide and hydrazide adipate, and the like.

Examples of the phenol group-containing curing agent may include catechol, resorcin, hydroquinone, pyrogallol, hydroxyhydroquinone, chloroglycine, 2,2-bis(4-hydroxyphenyl)propane [bisphenol A], 2-2-bis(4-hydroxyphenyl)butane [bisphenol B], 1,1-bis(4-hydroxyphenyl)ethane, bis(4-hydroxyphenyl)methane [bisphenol F], 4-hydroxyphenyl ether, p-(4-hydroxyphenyl) phenol, oxybis(4-hydroxyphenyl), sulfonylbis(4-hydroxyphenyl) and the like.

Examples of the imidazole group-containing curing agent, which may also be used as a catalyst, may include imidazole, 2-ethylimidazole, 2-ethyl-4-methylimidazole, and the like.

Examples of the hydroxyl group-containing curing agent may include ethylene glycol, trimethylol propane, pentaerythritol, polyester polyol, acrylic polyol and the like.

Examples of the radical polymerization initiator may include peroxides such as benzoyl peroxide, di-t-butyl hydroperoxide, t-butyl hydroperoxide, cumyl peroxide, cumene hydroperoxide, diisopropylbenzal hydroperoxide, t-butylperoxybenzoate, lauryl peroxide, acetyl peroxide, t-butylperoxy-2-ethylhexanoate and the like; azo compounds such as α,α'-azobisisobutylnitrile, azobisdimethylvaleronitrile, azobiscyclohexanecarbonitrile and the like; and the like.

Examples of the cationic polymerization curing agent, which may also be used as a catalyst, may include aromatic sulfonium salts such as benzyl-4-hydroxy-phenyl methylsulfonium hexafluoroantimonate, benzyl-4-hydroxyphenyl-methylsulfonium hexafluorophosphate, 4-acetoxyphenylbenzyl-4-hydroxyphenyl-methylsulfonium hexafluoroantimonate, 4-acetoxyphenyldimethylsulfonium hexafluoroantimonate, benzyl-4-methoxyphenylmethylsulfonium hexafluoroantimonate, benzyl-2-methyl-4-hydroxyphenylmethylsulfonium hexafluoroantimonate, benzyl-3-chloro-4-hydroxyphenylmethylsulfonium hexafluoroantimonate, benzyl-3-methyl-4-hydroxy-5-tert-butylphenyl-methylsulfonium hexafluoroantimonate, 4-methoxybenzyl-4-hydroxyphenyl-methylsulfonium hexafluorophospate, dibenzyl-4-hydroxyphenylsulfonium hexafluoroantimonate, dibenzyl-4-hydroxyphenylsulfonium hexafluorophosphate, 4-acetoxyphenyldibenzylsulfonium hexafluoroantimonate, dibenzyl-4-methoxyphenylsulfonium hexafluoroantimonate, nitrobenzyl-4-hydroxyphenylmethylsulfonium hexafluoroantimonate, 3,5-dinitro-benzyl-4-hydroxyphenylmethylsulfonium hexafluororantimonate, β-nephtylmethyl-4-hydroxyphenylmethylsulfonium hexafluoroantimonate and the like; tetraethylammonium bromide, and the like.

The curing agent used in the present invention may have a weight average molecular weight of about 1000 or less, preferably 500 or less from the standpoint of easiness of forming a clathrate compound.

The curing catalyst used in the present invention may include metal curing catalyst, acid curing catalyst and chain transfer agent.

Examples of the metal curing catalyst may include bismuth nitrate, lead 2-ethylhexanoate, lead benzoate, lead oleate, sodium trichlorophenoate, sodium propionate, lithium acetate, potassium oleate, tetrabutyltin, chlorotributyltin, dichlorodibutyltin, trichlorobutyltin, tin chloride, tributyltin-o-phenolate, tributyltin cyanate, tin octylate, tin oleate, tin tartrate, dibutyltin di(2-ehylhexylate), dibenzyltin di(2-ethylhexylate), dibutyltin dilaurate, dibutyltin diisooctylmaleate, dibutyltin sulfide, dibutyltin dibutoxide, dibutyltin bis(o-phenylphenolate), dibutyltin bis(acetylacetonate), di(2-ethylhexyl)tin oxide, aluminum trimethoxide, aluminum triisopropoxide, tris(ethylacetoacetate)aluminum, tetramethyl titanate, tetraethyl titanate, tetra-n-propyl titanate, tetraisopropyl titanate, tetrakis(acetylacetonate)titanium, tetrakis(n-propyl-acetoacetate)titanium, tetrakis(ethylacetoacetate)titanium, tetraethyl zirconate, tetra-n-propyl zirconate, tetraisopropyl zirconate, tetra-n-butyl zirconate, tetrakis(acetylacetonate)zirconum, tetrakis(n-propylacetoacetate)zirconum, tetrakis(ethylacetoacetate)zirconum and the like.

Examples of the acid curing catalyst may include sulfuric acid, phosphoric acid, paratoluene sulfonic acid, dodecyl benzene sulfonic acid, dinonyl naphthalene sulfonic acid, dinonyl naphthalene disulfonic acid, trichloroacetic acid, trifluoromethane sulfonic acid, monobutyl phosphate, dibutyl phosphate, boron trifluoride, and the like.

Examples of the chain transfer agent may include mercaptans such as n-octyul mercaptan, n-dodecyl mercaptan, n-butyl mercaptan and the like; disulfides such as bis-2-aminodiphenyl disulfide and the like; ethylthioglycolate, diazothioether and the like.

The base resin may include hydroxyl group-containing acrylic resin, polyester resin, alkyd resin, silicone resin, epoxy resin and the like; (anhydrous)carboxyl group-containing acrylic resin, polyester resin and the like; methylol group-containing acrylic resin and the like; chloro group-containing acrylic resin and the like; amide group-containing polyester resin, acrylic resin and the like; (hydrolyzable silane)silanol group-containing acrylic resin and the like; epoxy group-containing acrylic resin, bisphenol/epichlorohydrin based resin, novolak epoxy resin and the like; (alkoxy)methylol group-containing acrylic resin and the like; radically polymerizable unsaturated group-containing acrylic resin, polyester resin, epoxy resin, alkyd resin, polyurethane resin and the like.

In the present invention, inclusion of the guest compounds such as the curing agent and curing catalyst into the host compound consisting of the tetrakisphenols for forming a clathrate compound may be carried out by heating a mixture of the host compound with a solid, liquid or an aqueous or organic solvent solution of the guest compound at a temperature of normal temperature to 100° C.

A mixing ratio between the guest compound and the host compound may vary depending on the kind of the guest compound, but usually is such that the guest compound is in the range of 1 to 70% by weight, preferably 2 to 60% by weight based on a total weight of both compounds.

An amount of the clathrate compound contained in the coating composition may be determined depending on an amount of the functional group in the base resin, but usually may be in the range of about 10 to 200 parts by weight, preferably about 20 to 150 parts by weight as the curing agent, and in the range of about 0.001 to 20 parts by weight, preferably 0.01 to 10 parts by weight as the curing catalyst per 100 parts by weight of the base resin respectively. The clathrate compound has a mean particle size of about 100 $\mu$m or less, preferably about 0.01 to 80 $\mu$m, more preferably about 0.01 to 50 $\mu$m.

In use, the curing agent and curing catalyst may be totally or partly included into the host compound.

The coating composition of the present invention may include a powder coating composition, water-based coating composition, liquid coating composition having a solid content of 100%, and organic solvent based coating composition.

The coating composition of the present invention may optionally include fillers, coloring agents, pigments, flowability controlling agents, anti-cissing agents and the like.

The coating composition of the present invention may be applicable to a substrate such as paper, plastic, metal, combinations thereof, and the like.

The coating composition of the present invention may be coated onto the substrate followed by being left to stand at room temperature or being heated to form a cured film.

The coating composition of the present invention may be coated, followed by being heated so that the curing agent and curing catalyst may rapidly be excluded from the host compound, and taking place a crosslinking reaction between the excluded curing agent and the base resin or promoting the crosslinking reaction in the presence of the excluded curing catalyst to form a cured film.

A temperature, at which the curing agent and curing catalyst are excluded, or heat curing temperature may vary depending on the kind of the guest compound such as the curing agent and curing catalyst and on a mixing ratio between the guest compound and the host compound, and may suitably the selected under respective conditions in the range of 20 to 300° C.

The coating method may include any known processes, for example, a fluidized bed dip coating, electrostatic powder coating, friction-electrified powder coating and the like for the powder coating composition, spray coating, roll coating, gravure coating, screen coating and the like for other liquid coating compositions. A coating film thickness of a cured film may be in the range of about 40 to 200 $\mu$m, preferably about 50 to 100 $\mu$m for the powder coating composition, and in the range of about 1 to 200 $\mu$m, preferably about 10 to 100 $\mu$m for the liquid coating composition other than the powder coating composition.

The present invention can provide a curable coating composition having good storage stability and capable of forming a coating film showing good low temperature curing properties.

The present invention is explained more in detail by the following Examples.

EXAMPLE 1

A mixture of 200 grams of a xylol organic solvent solution having a solid content of 50% by weight and containing Epikote 1001 (Marketed by Yuka Shell Epoxy Co., Ltd., trade name, bisphenol A-epichlorohydrin type epoxy resin, weight average molecular weight 900) with 35 grams of a white powder clathrate compound (A) having a mean particle size of about 5 $\mu$m and having a weight ratio of 87 to 13 of 1,1,2,2-tetrakis(4-hydroxyphenyl)ethane to ethylenediamine was dispersed to obtain an organic solvent-based coating composition of Example 1.

EXAMPLE 2

A mixture of 200 grams of a xylol organic solvent solution having a solid content of 50% by weight and containing Epikote 1004 (Marketed by Yuka Shell Epoxy Co., Ltd., trade name, bisphenol A-epichlorohydrin type epoxy resin; melting point 97–103° C., weight average molecular weight 1400) with 35 grams of a white powder clathrate compound (B) having a mean particle size of about 5 $\mu$m and having a weight ratio of 66 to 34 of 1,1,2,2-tetrakis(4-hydroxyphenyl) ethane to 2-ethyl-4-methylimidazole was dispersed to obtain an organic solvent-based coating composition of Example 2.

EXAMPLE 3

A mixture of 100 grams of Epikote 1004 (the above trade name), 15 grams of the clathrate compound (B) and 50 grams of titanium dioxide (white pigment) was fused and dispersed by use of a three-roll heating roller, followed by cooling, roughly grinding, finely grinding, filtering with a 150 mesh screen to obtain a powder coating composition of Example 3.

EXAMPLE 4

A mixture of 100 grams of Epikote 1004 (the above trade name), 9 grams of the clathrate compound (B) and 50 grams of titanium dioxide (white pigment) was fused and dispersed by use of a three-roll heating roller, followed by cooling, roughly grinding, finely grinding, filtering with a 150 mesh screen to obtain a powder coating composition of Example 4.

EXAMPLE 5

Example 4 was duplicated except that 3 grams of the clathrate compound (B) containing 2-ethyl-4-methylimidazole as a curing catalyst and 10 grams of dihydrazide adipate as the curing agent were used to obtain a powder coating composition of Example 5.

EXAMPLE 6

A powder coating composition was prepared in the same manner as in Example 3 except that 15 grams of the clathrate compound (B) was not added, followed by dry mixing the powder coating composition with 15 grams of the clathrate compound (B) to obtain a powder coating composition of Example 6.

COMPARATIVE EXAMPLE 1

Example 1 was duplicated except that 4.5 grams of ethylenediamine was used in place of the clathrate compound (A) to obtain an organic solvent based coating composition of Comparative Example 1.

COMPARATIVE EXAMPLE 2

Example 2 was duplicated except that 3 grams of 2-ethyl-4-methylimidazole was used in place of the clathrate compound (B) to obtain an organic solvent based coating composition of Comparative Example 2.

COMPARATIVE EXAMPLE 3

Example 3 wad duplicated except that 1.4 grams of 2-ethyl-4-methylimidazole was used in place of the clathrate compound (B) to obtain a powder coating composition of Comparative Example 3.

Performances of organic solvent based coating compositions of Examples 1 and 2, and Comparative Examples 1 and 2 are shown in the following Table 1.

TABLE 1

|  |  | Examples | | Comparative Examples | |
|---|---|---|---|---|---|
|  |  | 1 | 2 | 1 | 2 |
| Storage stability of coating composition | | 4 | 4 | 1 | 2 |
| Coating film appearance | | 3 | 4 | 1 | 2 |
| Coating film performances | Curing properties | 3 | 3 | 3 | 3 |
|  | Adhesion properties | 3 | 3 | 2 | 2 |
|  | Salt spray corrosion resistance (mm) | 2.0 | 1.0 | 4.0 | 2.5 |

Storage Stability of Coating Composition

A coating composition sample was stored at 20° C. to measure a time required for taking place thickening and gelation. Evaluation was made as follows. 1: shorter than one day; 2: one day or longer but shorter than 7 days; 3:7 days or longer but shorter than one month; 4: one month or longer.

Preparation of Test Panels

A coating composition sample was coated onto a zinc phosphate-treated steel sheet to be a cured film thickness of 30 μm by use of a bar coater, followed by heat curing at 120° C. for 20 minutes to obtain a test panel to be used in coating film performances tests as follows.

Coating Film Appearance

Smoothness and gloss on the surface of the coating film were visually evaluated as follows. 4: good in smoothness and gloss; 3: fair in smoothness and gloss; 2: poor in smoothness and gloss; 1: very poor in smoothness and gloss.

Curing Properties

The surface of the coating film on the test panel was wiped reciprocally 10 times with three sheets-laminated gauze impregnated with methyl ethyl ketone to examine development of marks and extent of dissolution. Evaluation was made as follows. 3: nothing abnormal; 2: some marks developed; 1: coating film dissolved, substrate exposed.

Adhesion Properties

The coating film on the test panel was crosscut with a sharp knife to form 100 squares (1×1 mm), followed by adhering thereto an adhesive cellophane tape, rapidly separating the tape, and by examining a number of remaining squares without being peeled off. Evaluation was made as follows. 4: Nothing peeled off; 3: 5 squares or less peeled off; 2: 5 or more squares, but less than 15 squares peeled off; 1: 15 squares or more peeled off. Salt spray corrosion resistance:

A X cut mark was formed through the coating film on the test panel with a knife, followed by being subjected to a salt spray test for 240 hours in accordance with JIS Z-2371 to measure a width (mm) of rust and blister.

Performances of the powder coating compositions of Examples 3 to 6, and Comparative Example 3 are shown in the following Table 2.

TABLE 2

|  |  | Examples | | | | Comparative Examples |
|---|---|---|---|---|---|---|
|  |  | 3 | 4 | 5 | 6 | 3 |
| Storage stability of coating composition | | 4 | 4 | 4 | 4 | 1 |
| Coating film appearance | | 3 | 3 | 3 | 3 | 1 |
| Coating film performances | Curing properties | 3 | 3 | 3 | 3 | 3 |
|  | Adhesion properties | 3 | 3 | 3 | 3 | 2 |
|  | Salt spray corrosion resistance (mm) | 1.5 | 1.0 | 1.0 | 1.0 | 3.0 |

Performance tests were carried out as follows.

Storage Stability of Powder Coating Composition

A powder coating composition sample was stored at 20° C. for 7 days and one month at room temperature, followed by being subjected to electrostatic powder coating to form a coating film having a film thickness of 80 μm, heat curing the coating film at 130° C. for 20 minutes to visually examine smoothness and gloss compared with those of the coating film prior to storage. Evaluation was made as follows. 5: no change in smoothness and gloss; 4: slightly poor in gloss; 3: slightly poor in smoothness and gloss; 2: very poor in smoothness and gloss; 1: development of thickening and gelation during the preparation of the powder coating composition.

Preparation of Test Panels

A powder coating composition sample was coated onto a zinc phosphate-treated steel sheet to be a cured film thickness of 80 μm by use of an electrostatic powder coating apparatus, followed by heat curing at 130° C. for 20 minutes to obtain a test panel to be used in coating film performances test as follows.

Coating film appearance: Same as in Examples 1 and 2.

Curing properties: Same as in Examples 1 and 2.

Adhesion properties: Same as in Examples 1 and 2.

Salt spray corrosion resistance: Same as in Examples 1 and 2.

What is claimed is:

1. A curable coating composition comprising (A) a functional group-containing base resin and (B) a clathrate compound consisting of (i) at least one guest compound selected from the group consisting of a curing agent having a functional group crosslinkable with the functional group of the base resin and a curing catalyst, and (ii) a host compound consisting of tetrakisphenols, said clathrate compound having a mean particle size of 0.01 to 80 μm.

2. A curable coating composition as claimed in claim 1, wherein the tetrakisphenols are selected from ones represented by the following general formulas (I) and (II):

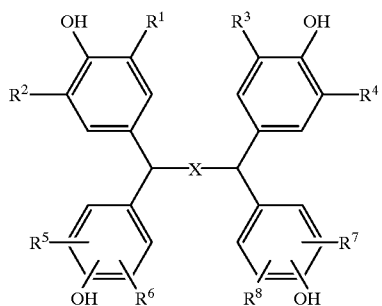

(I)

where X represents $(CH_2)_n$, represents 0, 1 or 2, $R^1$ to $R^8$ represent at least one selected from the group consisting of hydrogen atom, lower alkyl group, halogen atom, lower alkoxy group and substituted or unsubstituted phenyl group respectively;

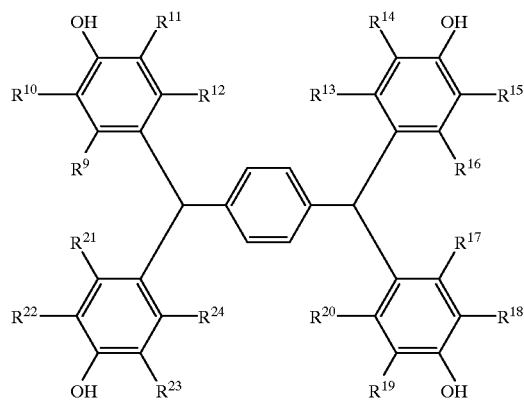

(II)

where $R^9$ to $R^{24}$ respectively represent at least one selected from hydrogen atom, lower alkyl group, halogen atom, lower alkoxy group and substituted or unsubstituted phenyl group.

3. A curable coating composition as claimed in claim 1, wherein the guest compound is the curing agent, and the clathrate compound is contained in the range of 10 to 200 parts by weight per 100 parts by weight of the base resin.

4. A curable coating composition as claimed in claim 1, wherein the guest compound is the curing catalyst, and the clathrate compound is contained in the range of 0.001 to 20 parts by weight per 100 parts by weight of the base resin.

5. A curable coating composition as claimed in claim 1, wherein the curable coating composition is selected from the group consisting of powder coating composition, water-based coating composition, liquid coating composition having a solid content of 100% and organic solvent based coating composition.

* * * * *

Disclaimer

6,147,169 — Kazuhiko Ohnishi, Hiratsuka, Japan. CURABLE COATING COMPOSITION. Nov. 14, 2000. Disclaimer filed on March 13, 2012, by the Assignee, Kansai Paint Co.

Hereby enters this disclaimer to claims 1 to 5 of said patent.

*(Official Gazette, June 25, 2013)*